(12) United States Patent
Zeng et al.

(10) Patent No.: US 8,127,117 B2
(45) Date of Patent: Feb. 28, 2012

(54) METHOD AND SYSTEM TO COMBINE CORRESPONDING HALF WORD UNITS FROM MULTIPLE REGISTER UNITS WITHIN A MICROPROCESSOR

(75) Inventors: Mao Zeng, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 11/431,300

(22) Filed: May 10, 2006

(65) Prior Publication Data
US 2007/0266226 A1    Nov. 15, 2007

(51) Int. Cl.
G06F 9/30 (2006.01)
G06F 9/40 (2006.01)
G06F 7/38 (2006.01)
G06F 9/00 (2006.01)
G06F 9/44 (2006.01)

(52) U.S. Cl. ........................................ 712/224; 712/210
(58) Field of Classification Search .................. 712/224, 712/210
See application file for complete search history.

(56) References Cited

U.S. PATENT DOCUMENTS

| | | | |
|---|---|---|---|
| 5,564,056 A * | 10/1996 | Fetterman et al. | 712/23 |
| 6,052,522 A | 4/2000 | Mattela et al. | |
| 6,463,525 B1 * | 10/2002 | Prabhu | 712/222 |
| 6,631,460 B1 * | 10/2003 | Morris et al. | 712/217 |
| 6,978,359 B2 | 12/2005 | Miyamori | |
| 7,092,526 B2 * | 8/2006 | Lee | 380/37 |
| 7,228,403 B2 | 6/2007 | Leber et al. | |
| 7,237,096 B1 * | 6/2007 | Prabhu et al. | 712/218 |

(Continued)

FOREIGN PATENT DOCUMENTS
EP    0743591 A1    11/1996
(Continued)

OTHER PUBLICATIONS

Lee et al., PLX: An Instruction Set Architecture and Testbed for Multimedia Information Processing, May 2005, pp. 85-108.*

(Continued)

*Primary Examiner* — Eddie P Chan
*Assistant Examiner* — George Giroux
(74) *Attorney, Agent, or Firm* — Peter M. Kamarchik; Nicholas J. Pauley; Jonathan T. Velasco

(57) ABSTRACT

A method and system to combine corresponding half word units from multiple register units within a microprocessor, such as, for example, a digital signal processor, during execution of a single instruction are described. An instruction to combine predetermined disparate source register units from a register file structure is received within a processing unit. The instruction is then executed to combine corresponding half word units from the source register units and to input the half word units into respective portions of a resulting destination register unit. During the execution of the instruction, the predetermined source register units are identified and corresponding most significant half word units and associated data are retrieved from the identified register units. The retrieved half word units are further combined and input into a respective most significant portion of a resulting destination register unit. Similarly, corresponding least significant half word units and associated data are retrieved from the identified register units. The retrieved half word units are further combined and input into a respective least significant portion of a resulting destination register unit. Finally, the resulting destination register unit is stored into the register file structure for further processing.

33 Claims, 6 Drawing Sheets

U.S. PATENT DOCUMENTS

| | | | |
|---|---|---|---|
| 2002/0027552 A1* | 3/2002 | Lee | 345/421 |
| 2004/0064677 A1* | 4/2004 | Morris | 712/210 |
| 2005/0125640 A1* | 6/2005 | Ford et al. | 712/225 |
| 2005/0203928 A1* | 9/2005 | Sankaran | 707/100 |
| 2007/0276646 A1* | 11/2007 | Dutt et al. | 703/22 |

FOREIGN PATENT DOCUMENTS

| | | |
|---|---|---|
| EP | 0743592 | 11/1996 |
| GB | 2409064 | 6/2005 |

OTHER PUBLICATIONS

Lee et al., Multimedia Instructions in IA-64, Aug. 2001, pp. 1-4.*

International Preliminary Report on Patentability—PCT/US07/068394, The International Bureau of WIPO, Geneva Switzerland—Nov. 11, 2008.

International Search Report—PCT/US07/068394, International Search Authority—European Patent Office—Oct. 29, 2007.

Written Opinion—PCT/US07/068394, International Search Authority—European Patent Office—Oct. 29, 2007.

Hennessy, John, Patterson, David, "Computer Architecture" 3rd Edition, pp. 290-294, May 15, 2002.

Lee, R.B.: "Subword Parallelism with Max-2": IEE Micro, IEEE Service Center, Los Alamitos, CA, US: vol. 16, No. 4; Aug. 1, 1996; pp. 51-59, XP000596513; ISSN: 0272-1732.

* cited by examiner

METHOD AND SYSTEM TO COMBINE CORRESPONDING HALF WORD UNITS FROM MULTIPLE REGISTER UNITS WITHIN A MICROPROCESSOR

BACKGROUND

1. Field of the Invention

The invention relates generally to microprocessors and, more specifically, to a method and system to combine corresponding half word units from multiple register units within a microprocessor, such as, for example, a digital signal processor, during execution of a single instruction.

2. Background

Typically, computer systems include one or more microprocessor devices, each microprocessor device being configured to perform operations on values stored within a memory of the computer system and to manage the overall operation of the computer system. These computer systems may also include various multimedia devices, such as, for example, sound cards and/or video cards, each multimedia device further including one or more processors, such as, for example, digital signal processors (DSPs), which perform complex mathematical computations within each respective multimedia device.

A digital signal processor (DSP) typically includes hardware execution units specifically configured to perform such mathematical calculations, such as, for example, one or more arithmetic logic units (ALU), one or more multiply-and-accumulate units (MAC), and other functional units configured to perform operations specified by a set of instructions within the DSP. Such operations may include, for example, arithmetic operations, logical operations, and other data processing operations, each being defined by an associated set of instructions.

Generally, the execution units within the DSP read data and operands from a register file coupled to the memory and to the execution units, perform the instruction operations, and store the results into the register file. The register file includes multiple register units, each register unit being accessible as a single register or as aligned pairs of two adjacent register units. However, certain specific operations, such as, for example, operations to add or subtract data, require data from disparate register units within the register file to be properly aligned for execution of the instructions. Thus, what is needed is a method and system to combine corresponding half word units from multiple non-adjacent or disparate register units within a DSP during execution of a single instruction in order to enable proper alignment of data stored within such register units.

SUMMARY

A method and system to combine corresponding half word units from multiple register units within a microprocessor, such as, for example, a digital signal processor, during execution of a single instruction are described. In one embodiment, an instruction to combine predetermined disparate source register units from a register file structure is received within a processing unit. The instruction is then executed to combine corresponding half word units from the source register units and to input the half word units into respective portions of a resulting destination register unit.

In one embodiment, the predetermined source register units are identified and corresponding most significant half word units and associated data are retrieved from the identified register units. The retrieved half word units are further combined and input into a respective most significant portion of a resulting destination register unit. Similarly, corresponding least significant half word units and associated data are retrieved from the identified register units. The retrieved half word units are further combined and input into a respective least significant portion of a resulting destination register unit. Finally, the resulting destination register unit is stored into the register file structure for further processing.

DETAILED DESCRIPTION

A method and system to combine corresponding half word units from multiple register units within a microprocessor, such as, for example, a digital signal processor, during execution of a single instruction are described. Although the system described below enables a digital signal processor to combine the corresponding half word units from register units, it is to be understood that the system may be implemented using a microprocessor device, or any other processing unit capable of combining such corresponding half word units from multiple register units into a resulting register unit during execution of a single instruction.

In one embodiment, an instruction to combine predetermined disparate source register units from a register file structure is received within a processing unit. The instruction is then executed to combine corresponding half word units from the source register units and to input the half word units into respective portions of a resulting destination register unit.

During the execution of the instruction, the predetermined source register units are identified and corresponding most significant half word units and associated data are retrieved from the identified register units. The retrieved half word units are further combined and input into a respective most significant portion of a resulting destination register unit. Similarly, corresponding least significant half word units and associated data are retrieved from the identified register units. The retrieved half word units are further combined and input into a respective least significant portion of a resulting destination register unit. Finally, the resulting destination register unit is stored into the register file structure for further processing.

Figure 1:
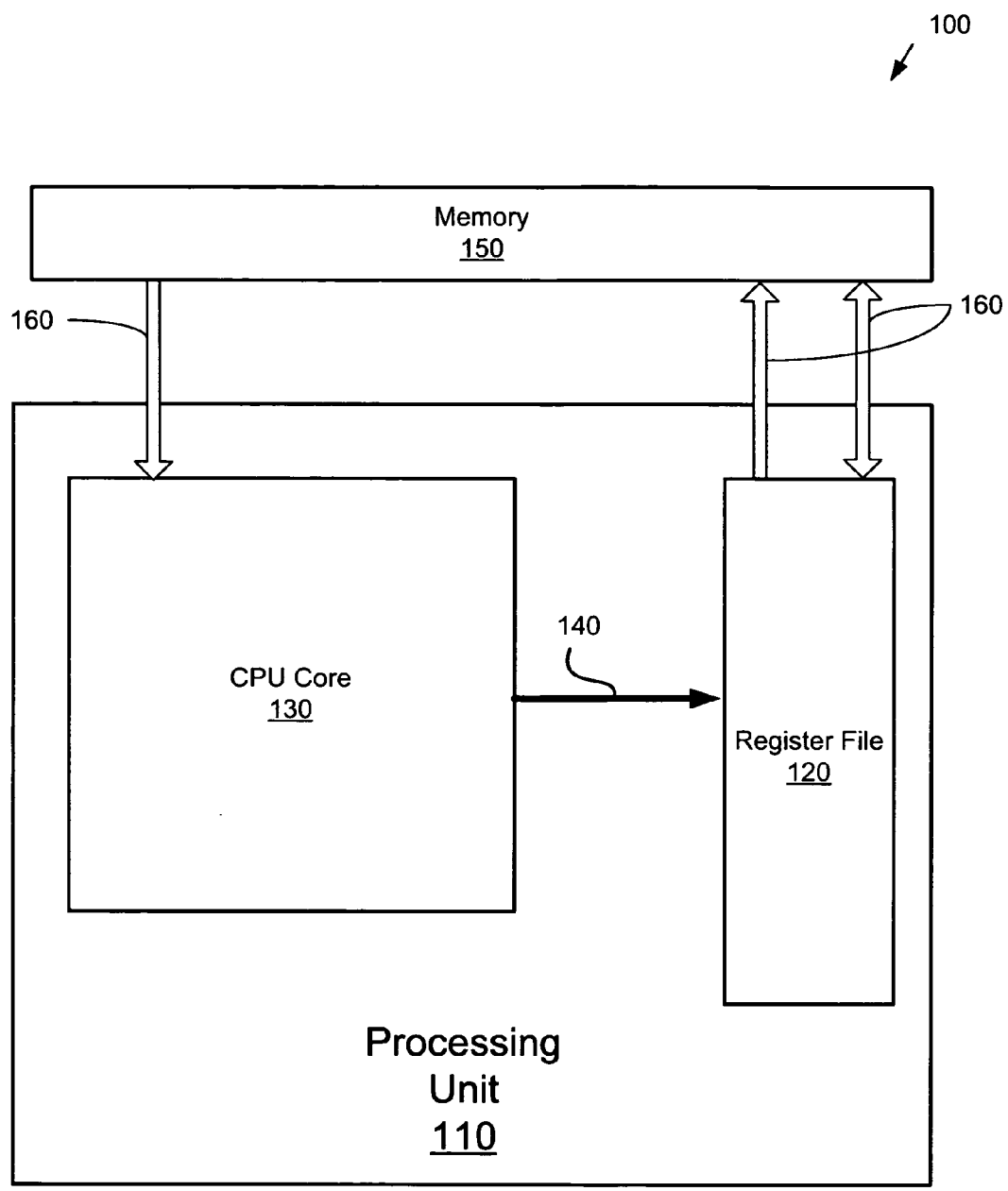
FIG. 1 is a block diagram of a digital signal processing system within which a set of instructions may be executed.

FIG. 1 is a block diagram of a digital signal processing system within which a set of instructions may be executed. As illustrated in FIG. 1, the digital signal processing system 100 includes a processing unit 110, a memory 150, and one or more buses 160 coupling the processing unit 110 to the memory 150.

The memory 150 stores data and instructions, such as, for example, in the form of VLIW packets produced by a VLIW compiler, each VLIW packet comprising one or more instructions. Each instruction of a packet is typically of a predetermined width and has a particular address in the memory 150, such that a first instruction in a packet typically has a lower memory address than a last instruction of the packet. Addressing schemes for a memory are well known in the art and are not discussed in detail here. Instructions in the memory 150 are loaded into the processing unit 110 via buses 160.

The processing unit 110 further comprises a central processing unit core 130 coupled to one or more register file structures 120 via one or more pipelines 140. The processing unit 110 may further comprise one or more microprocessors, digital signal processors, or the like.

The register file 120 further comprises a set of general register units, which support general purpose computations, and which are described in further detail below in connection with FIG. 2, and a set of control register units, which support special-purpose functionality, such as, for example, hardware loops, predicates, and other special operands.

Figure 2:
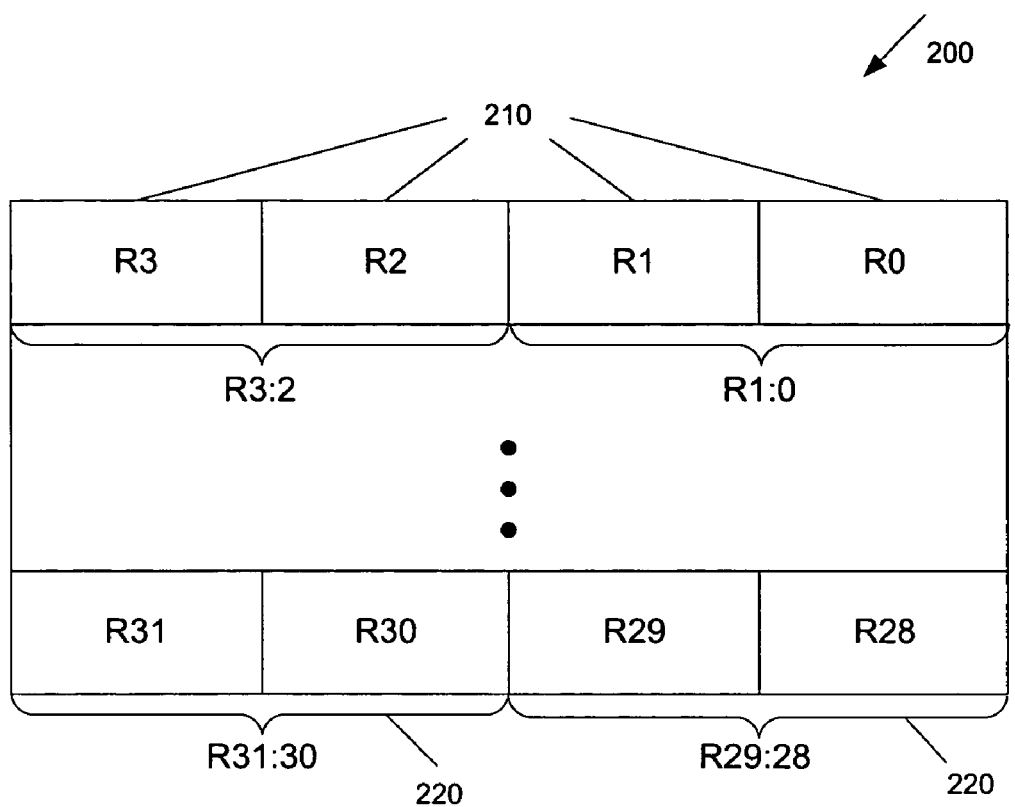
FIG. 2 is a block diagram illustrating one embodiment of a general register structure within the digital signal processing system.

FIG. 2 is a block diagram illustrating one embodiment of a general register structure within the digital signal processing system. As illustrated in FIG. 2, in one embodiment, the general register file structure 200 within the register file 120 includes multiple register units, such as, for example, thirty two 32-bit wide register units 210, each register unit being accessible as a single register or as aligned pairs 220 of two adjacent register units 210.

The general register units 210 can be referred to by multiple names based on the appropriate instruction. For example, register units 210 may be individually referred to as $R_0, R_1, \ldots, R_{30}$, and $R_{31}$. In addition, register units $R_0$ and $R_1$ may form a 64-bit register pair 220 referred to as $R_{1:0}$. Similarly, register units $R_2$ and $R_3$ may form a 64-bit register pair 220 referred to as $R_{3:2}$, register units $R_{28}$ and $R_{29}$ may form a 64-bit register pair 220 referred to as $R_{29:28}$, and register units $R_{30}$ and $R_{31}$, may form a 64-bit register pair 220 referred to as $R_{31:30}$.

In one embodiment, general register units 210 are used for general computational purposes, such as, for example, address generation, scalar arithmetic, and vector arithmetic, and provide all operands for instructions, including addresses for load/store instructions, data operands for numeric instructions, and vector operands for vector instructions. Each register unit 210 further includes a most significant half word unit, containing data located in a high portion of the register unit 210, and a least significant half word unit, containing data located in a low portion of the register unit 210. Considering, for example, a 32-bit wide register unit 210, the most significant half word unit and the least significant half word unit of the register unit 210 are both 16-bit wide units.

Figure 3:
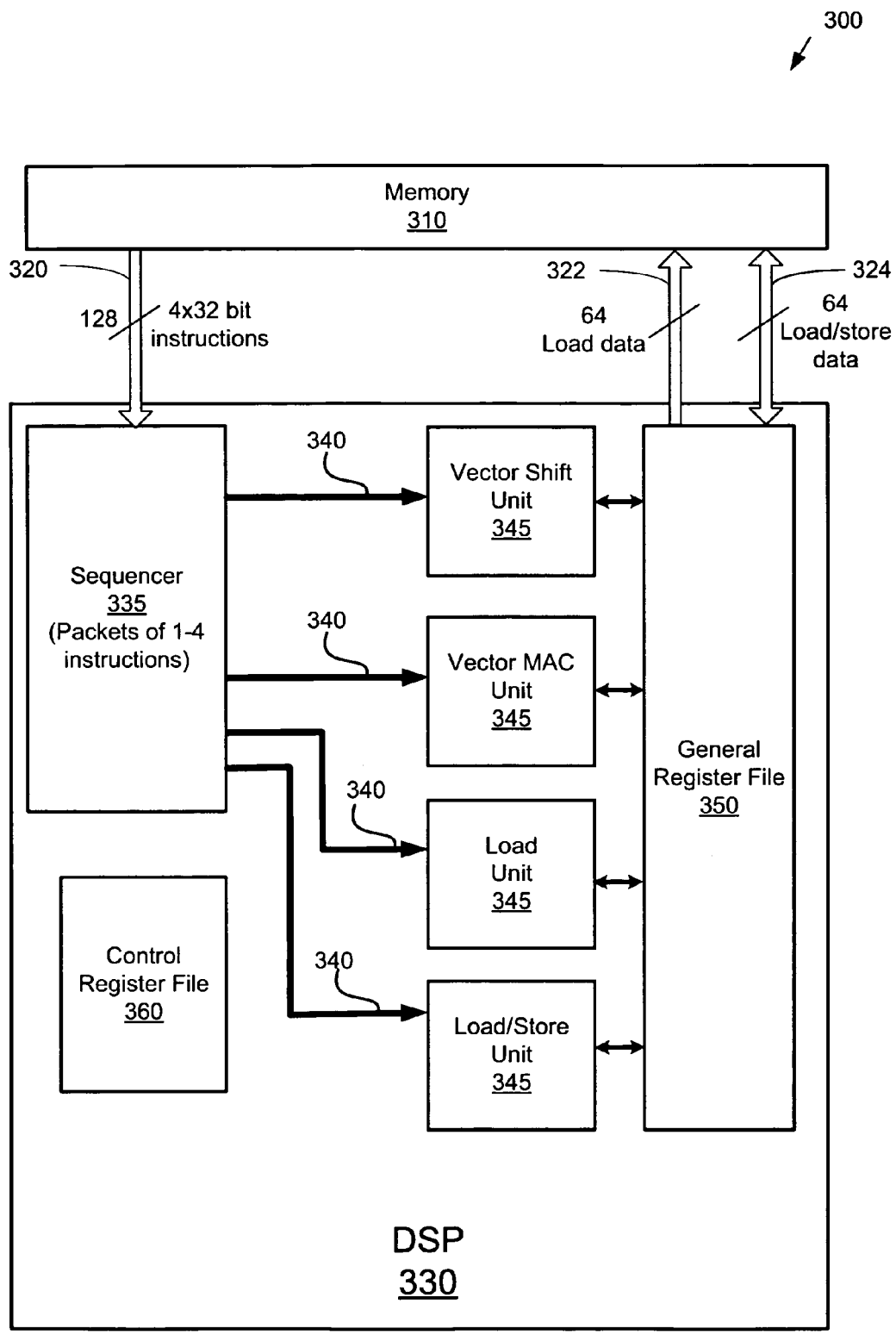
FIG. 3 is a block diagram illustrating one embodiment of a Very Long Instruction Word (VLIW) digital signal processing system architecture.

FIG. 3 is a block diagram illustrating one embodiment of a Very Long Instruction Word (VLIW) digital signal processing system architecture. The VLIW system architecture 300 includes a memory 310 coupled to a digital signal processor (DSP) 330 via an instruction load bus 320, a data load bus 322, and a data load/store bus 324.

In one embodiment, the memory 310 stores data and instructions, for example in the form of VLIW packets having one to four instructions. Instructions stored within the memory 310 are loaded to the DSP 330 via the instruction load bus 320. In one embodiment, each instruction has a 32-bit word width which is loaded to the DSP 330 via a 128-bit instruction load bus 320 having a four word width. In one embodiment, the memory 310 is a unified byte-addressable memory, has a 32-bit address space storing both instructions and data, and operates in little-endian mode.

In one embodiment, the DSP 330 comprises a sequencer 335, four pipelines 340 for four processing or execution units 345, a general register file structure 350 (comprising a plurality of general register units), such as, for example, the general register file structure 200 described in detail in connection with FIG. 2, and a control register file structure 360. The sequencer 335 receives packets of instructions from the memory 310 and determines the appropriate pipeline 340 and respective execution unit 345 for each instruction of each received packet using the information contained within the instruction. After making this determination for each instruction of a packet, the sequencer 335 inputs the instructions into the appropriate pipeline 340 for processing by the appropriate execution unit 345.

In one embodiment, the execution units 345 further comprise a vector shift unit, a vector MAC unit, a load unit, and a load/store unit. The vector shift unit 345 executes, for example, S-type, A64-type, A32-type, J-type, and CR-type instructions. The vector MAC unit 345 executes, for example, M-type, A64-type, A32-type, J-type, and JR-type instructions. The load unit 345 loads data from the memory 310 to the general register file structure 350 and executes, for example, load-type and A32-type instructions. The load/store unit 345 loads and stores data from the general register file structure 350 back to the memory 310 and executes, for example, load-type, store-type, and A32-type instructions.

Each execution unit 345 that receives an instruction performs the instruction using the general register file structure 350 that is shared by the four execution units 345. Data needed by an instruction is loaded to the general register file structure 350 via the 64-bit data load bus 322. After the instructions of a packet are performed by the execution units 345, the resulting data is stored to the general register file structure 350 and then loaded and stored to the memory 310 via the 64-bit data load/store bus 324. In one embodiment, for RISC-type machines, for example, one instruction can load data from the memory, perform the operation, and then store the results into the memory. Alternatively, for DSP units, the above operations are generally separated. Typically, the one to four instructions of a packet are performed in parallel by the four execution units 345 in one clock cycle, where a maximum of one instruction is received and processed by a pipeline 340 for each clock cycle.

In one embodiment, an execution unit 345 may also use the control register file structure 360 to execute a corresponding instruction. The control register file structure 360 comprises a set of special register units, such as, for example, modifier, status, and predicate register units.

Figure 4:
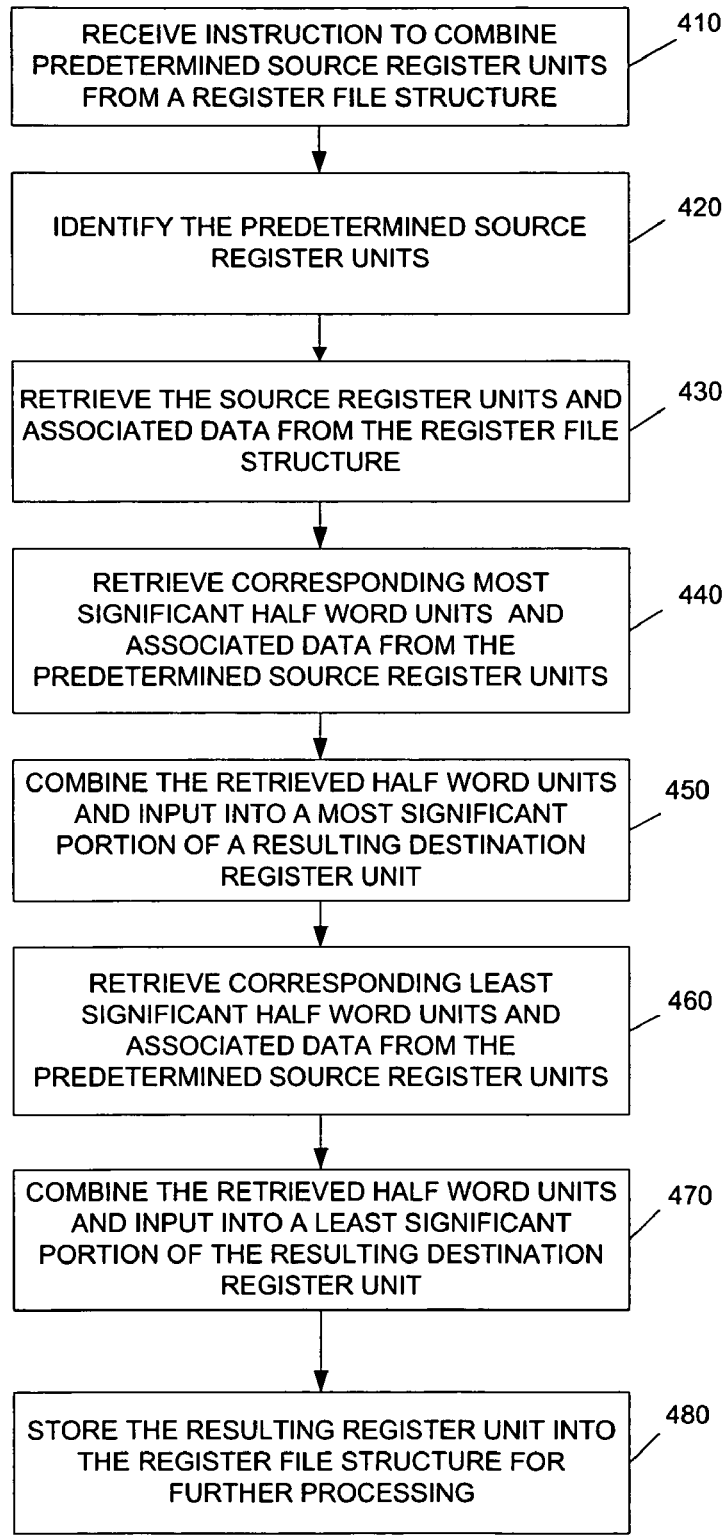
FIG. 4 is a flow diagram illustrating one embodiment of a method to combine corresponding half word units from multiple register units within the digital signal processing system.

FIG. 4 is a flow diagram illustrating one embodiment of a method to combine corresponding half word units from multiple register units within the digital signal processing system 100. As illustrated in the embodiment of FIG. 4, at processing block 410, an instruction to combine register units within the digital signal processing system 300 is received. In one embodiment, a processing unit, such as, for example, an execution unit 345 within the DSP 330 receives the instruction and executes the instruction, as described below, to combine corresponding half word units from predetermined source register units stored within the general register file structure 350. In one embodiment, the predetermined source register units are disparate, being non-adjacently located within the general register file structure 350 and, thus, being inaccessible as an aligned pair 220 of register units.

At processing block 420, the predetermined source register units, such as, for example, a first 32-bit wide source register unit and a second 32-bit wide source register unit, are identified. In one embodiment, the execution unit 345 communicates with the general register file structure 350 and identifies the source register units requested to be combined. In one embodiment, the memory 310 then loads data needed by the instruction to the general register file structure 350 via the 64-bit data load bus 322 and/or the 64-bit data load/store bus 324. Alternatively, data may already be stored within the identified first and second source register units.

At processing block 430, the identified source register units and associated data are retrieved. In one embodiment, the execution unit 345 retrieves the identified source register units and associated data from the general register file structure 350.

At processing block 440, corresponding most significant half word units are retrieved from the identified source register units. In one embodiment, the execution unit 345 further retrieves a half word unit, such as, for example, a 16-bit wide unit, from the first source register unit, which may, in one embodiment, be the most significant or high half word unit of the first source register unit, and a half word unit, such as, for example, a 16-bit wide unit, from the second source register unit, which may, in one embodiment, be the most significant or high half word unit of the second source register unit.

At processing block 450, the most significant half word units are combined and further input into a most significant or high portion of a resulting destination register unit. In one embodiment, the execution unit 345 combines the retrieved most significant half word units and inputs the combined half word units into the most significant or high portion of the resulting destination register unit.

At processing block 460, corresponding least significant half word units are retrieved from the identified source register units. In one embodiment, the execution unit 345 further retrieves a half word unit, such as, for example, a 16-bit wide unit, from the first source register unit, which may, in one embodiment, be the least significant or low half word unit of the first source register unit, and a half word unit, such as, for example, a 16-bit wide unit, from the second source register unit, which may, in one embodiment, be the least significant or low half word unit of the second source register unit.

At processing block 470, the least significant half word units are combined and further input into a least significant or low portion of the resulting destination register unit. In one embodiment, the execution unit 345 combines the retrieved least significant half word units and inputs the combined half word units into the least significant or low portion of the resulting destination register unit.

Finally, at processing block 480, the resulting destination register unit is stored for further processing. In one embodiment, the execution unit 345 outputs the resulting destination register unit to the general register file structure 350 and stores the resulting destination register unit for further processing of additional instructions.

Figure 5:
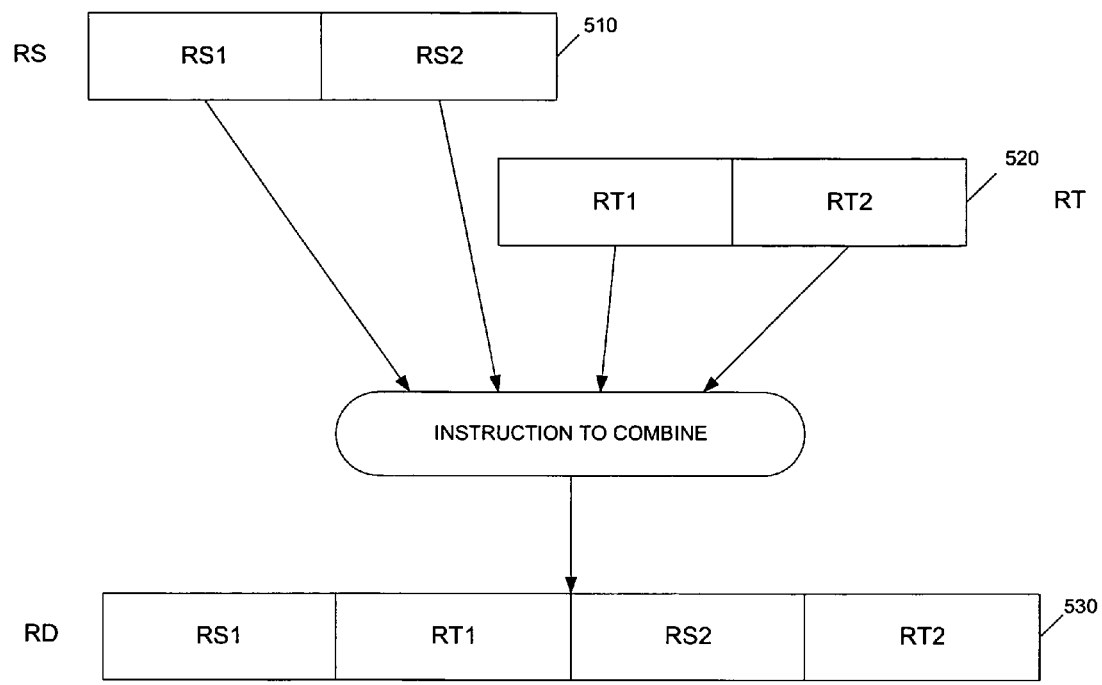
FIG. 5 is a block diagram illustrating the method to combine corresponding half word units from multiple register units, as described in connection with FIG. 4.

FIG. 5 is a block diagram illustrating the method to combine register units described in connection with FIG. 4. As illustrated in FIG. 5, source register units $R_S$ 510 and $R_T$ 520 are identified and retrieved from the general register file structure 200.

In one embodiment, the instruction to combine source register units $R_S$ 510 and $R_T$ 520 into a resulting destination register unit $R_D$ 530 is:

$$R_D = \text{pack}HL(R_S, R_T)$$

where $R_S$ and $R_T$ are source register units having respective most significant or high half word units H and least significant or low half word units L.

As shown in FIG. 5, upon execution of the instruction, the most significant or high half word unit $R_{S1}$ of the source register unit $R_S$ 510 and the most significant or high half word unit $R_{T1}$ of the source register unit $R_T$ 520 are combined and further input into the high portion of the destination register unit $R_D$ 530. The least significant or low half word unit $R_{S2}$ of the source register unit $R_S$ 510 and the least significant or low half word unit $R_{T2}$ of the source register unit $R_T$ 520 are combined and further input into the low portion of the destination register unit $R_D$ 530. If, for example, $R_S$ 510 and $R_T$ 520 are both 32-bit wide register units, then, in one embodiment, the resulting destination register unit $R_D$ 530 is a 64-bit wide register.

Figure 6:
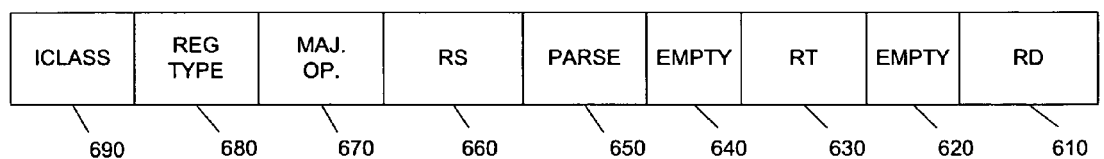
FIG. 6 is a block diagram of one embodiment of an instruction to combine corresponding half word units from multiple register units within the digital signal processing system.

FIG. 6 is a block diagram of one embodiment of an instruction to combine corresponding half word units from multiple register units within the digital signal processing system. As illustrated in FIG. 6, in one embodiment, the instruction described in connection with FIG. 5 includes multiple fields, such as, for example, a field 610 containing information necessary to encode the destination register unit $R_D$, an empty field 620 reserved for future encoding, a field 630 containing information necessary to encode the source register unit $R_T$, another empty field 640 reserved for future encoding, a field 650 containing packet/loop parsing bit information, a field 660 containing information necessary to encode the register unit $R_{S1}$, a field 670 containing operation code information, a field 680 containing information related to the register types of the source and destination register units, and a field 690 containing instruction class information. Alternatively, however, other additional fields may also be included within the encoding of the above instructions without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. It is to be understood that these embodiments may be used as or to support software programs, which are executed upon some form of processor or processing core (such as the CPU of a computer), or otherwise implemented or realized upon or within a machine or computer readable medium. A machine readable medium includes any mechanism for storing or transmitting information in a form readable by a machine (e.g., a computer). For example, a machine readable medium includes RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A non-transitory computer-readable medium comprising:
    a packing instruction to operate on non-adjacent source registers, wherein the packing instruction, when executed in a processing system, causes the processing system to:
        determine respective sizes of two non-adjacent source register units within a register file structure;
        use the determined respective sizes of the two non-adjacent source register units to
            identify respective widths of corresponding most significant half-word units of the two non-adjacent source register units,
        combine the corresponding most significant half-word units to produce a combined most significant word unit;
        input the combined most significant word unit into a most significant portion of a destination register unit, wherein the destination register unit is larger than either of the two non-adjacent source register units, and wherein the destination register unit comprises a single double-word destination register unit or an aligned pair of register units;
        combine corresponding least significant half-word units from the two non-adjacent source register units to produce a combined least significant word unit;
        input the combined least significant word unit into a least significant portion of the destination register unit; and
        store the destination register unit in the register file structure.

2. The non-transitory computer-readable medium of claim 1, wherein each of the two non-adjacent source register units is a 32-bit wide register unit and the destination register unit is a 64-bit wide register unit, wherein the destination register unit is sized to store four half-word units.

3. The non-transitory computer-readable medium of claim 2, wherein each of the most significant half-word units is a 16-bit wide unit and each of the least significant half-word units is a 16-bit wide unit.

4. The non-transitory computer-readable medium of claim 1, wherein execution of the instruction further causes the processing system to retrieve data associated with the two non-adjacent source register units from a memory, to store the data within the two non-adjacent source register units, to retrieve data associated with the most significant half-word units from the two non-adjacent source register units, and to store the data associated with the most significant half-word units into the most significant portion of the destination register unit.

5. The non-transitory computer-readable medium of claim 1, wherein the most significant half-word units from the two non-adjacent source register units are concatenated into the most significant portion of the destination register unit within the register file structure of a processor.

6. The non-transitory computer-readable medium of claim 1, wherein the two non-adjacent source register units are inaccessible as an aligned pair of register units.

7. The non-transitory computer-readable medium of claim 1, wherein execution of the instruction further causes the processing system to concatenate the least significant half-word units to produce the combined least significant word unit.

8. The non-transitory computer-readable medium of claim 7, wherein execution of the instruction further causes the processing system to concatenate the most significant half-word units to produce the combined most significant word unit.

9. The non-transitory computer-readable medium of claim 1, wherein the packing instruction comprises:
    a destination-register field containing information to encode the destination register unit;
    a first source-register field containing information to encode a first source register unit; and
    a second source-register field containing information to encode a second source register unit.

10. A method comprising:
    receiving an executable packing instruction to operate on non-adjacent source registers; and
    executing the packing instruction to:
        determine respective sizes of two non-adjacent source register units within a register file structure;
        use the determined respective sizes of the two non-adjacent source register units to identify respective widths of corresponding most significant half-word units of the two non-adjacent source register units within a register file structure;
        combine the corresponding most significant half-word units to produce a combined most significant word unit;
        input the combined most significant word unit into a most significant portion of a destination register unit, wherein the destination register unit is larger than either of the two non-adjacent source register units, and wherein the destination register unit comprises a single double-word destination register unit or an aligned pair of register units;

combine corresponding least significant half-word units from the two non-adjacent source register units to produce a combined least significant word unit;

input the combined east significant word unit into a least significant portion of the destination register unit; and store the destination register unit in the register file structure.

11. The method of claim 10, wherein each of the two non-adjacent source register units is a 32-bit wide register unit and the destination register unit is a 64-bit wide register unit, wherein the destination register unit is sized to store four half-word units.

12. The method of claim 11, wherein each of the most significant half-word units is a 16-bit wide unit and each of the least significant half-word units is a 16-bit wide unit.

13. The method of claim 10, wherein the executing further comprises:

retrieving data associated with the two non-adjacent source register units from a memory;

storing the data within the two non-adjacent source register units;

retrieving data associated with the corresponding most significant half-word units from the two non-adjacent source register units; and combining the data associated with the corresponding most significant half-word units into the most significant portion of the destination register unit.

14. The method of claim 10, wherein the most significant half-word units from the two non-adjacent source register units are concatenated into the most significant portion of the destination register unit within the register file structure of a processor.

15. The method of claim 10, wherein the two non-adjacent source register units are inaccessible as an aligned pair of register units.

16. The method of claim 10, further comprising concatenating the least significant half-word units to produce the combined least significant word unit.

17. The method of claim 10, further comprising concatenating the most significant half-word units to produce the combined most significant word unit.

18. The of claim 10, wherein the executable packing instruction comprises:

a destination-register field containing information to encode the destination register unit;

a first source-register field containing information to encode a first source register unit;

a second source-register field containing information to encode a second source register unit; and a register-type field containing information related to register types of the source register units and the destination register units.

19. An apparatus comprising:

a memory to store data comprising a packing instruction to operate on non-adjacent source registers; and a processor coupled to the memory, the processor further comprising a processing unit and a register file structure coupled to the processing unit;

the processing unit adapted to execute the packing instruction to:

determine respective sizes of two non-adjacent source register units within a register file structure;

use the determined respective sizes of the two non-adjacent source register units to identify respective widths of corresponding most significant half-word units of the two non-adjacent source register units within a register file structure;

combine the corresponding most significant half-word units to produce a combined most significant word unit;

store the combined most significant word unit in a most significant portion of a destination register unit, wherein the destination register unit is larger than either of the two non-adjacent source register units, and wherein the destination register unit comprises a single double-word destination register unit or an aligned pair of register units;

combine corresponding least significant half-word units from the two non-adjacent source register units to produce a combined least significant word unit;

store the combined least significant word unit in a least significant portion of the destination register unit; and store the destination register unit in the register file structure.

20. The apparatus of claim 19, wherein each of the two non-adjacent source register units is a 32-bit wide register unit and the destination register unit is a 64-bit wide register unit, wherein the destination register unit is sized to store four half-word units.

21. The apparatus of claim 20, wherein each of the most significant half-word units is a 16-bit wide unit and each of the least significant half-word units is a 16-bit wide unit.

22. The apparatus of claim 19, wherein the method further comprises retrieving data associated with the two non-adjacent source register units from the memory, storing the data within the two non-adjacent source register units, retrieving data associated with the least significant half-word units from the two non-adjacent source register units, and combining and storing the data associated with the least significant half-word units into the least significant portion of the destination register unit.

23. The apparatus of claim 19, wherein the most significant half-word units from the two non-adjacent source register units are concatenated into the most significant portion of the destination register unit within the register file structure of the processor.

24. The apparatus of claim 19, wherein the two non-adjacent source register units are inaccessible as an aligned pair of register units.

25. The apparatus of claim 19, wherein the processor concatenates the least significant half-word units to produce the combined least significant word unit.

26. The apparatus of claim 19, wherein the processor concatenates the most significant half-word units to produce the combined most significant word unit.

27. The apparatus of claim 19, wherein the packing instruction comprises:

a destination-register field containing information to encode the destination register unit;

a first source-register field containing information to encode a first source register unit;

a second source-register field containing information to encode a second source register unit; and an instruction-dass field containing instruction class information.

28. An apparatus comprising:

means for receiving a packing instruction to operate on non-adjacent source registers; and means for executing the packing instruction to:

determine respective sizes of two non-adjacent source register units within a register file structure;

use the determined respective sizes of the two non-adjacent source register units to identify respective widths of corresponding most significant half-word units of the two non-adjacent source register units within a register file structure;

combine the corresponding most significant half-word units to produce a combined most significant word unit;

input the combined most significant word unit into a most significant portion of a destination register unit, wherein the destination register unit is larger than either of the two non-adjacent source register units, and wherein the destination register unit comprises a single double-word destination register unit or an aligned pair of register units;

combine corresponding least significant half-word units from the two non-adjacent source register units to produce a combined least significant word unit;

input the combined least significant word unit into a least significant portion of the destination register unit; and store the destination register unit in the register file structure.

29. The apparatus of claim 28, wherein each of the two non-adjacent source register units is a 32-bit wide register unit and the destination register unit is a 64-bit wide register unit, wherein the destination register unit is sized to store four half-word units.

30. The apparatus of claim 29, wherein each of the most significant half-word units is a 16-bit wide unit and each of the least significant half-word units is a 16-bit wide unit.

31. The apparatus of claim 28, further comprising:
means for retrieving data associated with the two non-adjacent source register units from a memory;
means for storing the data within the two non-adjacent source register units;
means for retrieving data associated with the least significant half-word units from the two non-adjacent respective source register units; and
means for combining the data associated with the least significant half-word units into the least significant portion of the resulting destination register unit.

32. The apparatus of claim 28, wherein the two non-adjacent source register units are inaccessible as an aligned pair of register units.

33. The apparatus of claim 28, wherein the packing instruction comprises:
a destination-register field containing information to encode the destination register unit;
a first source-register field containing information to encode a first source register unit;
a second source-register field containing information to encode a second source register unit;
a register-type field containing information related to register types of the source register units and the destination register units; and
an instruction-class field containing instruction class information.

* * * * *